(12) United States Patent
Hagimori

(10) Patent No.: US 6,646,816 B2
(45) Date of Patent: Nov. 11, 2003

(54) PORTABLE TERMINAL AND DRIVE METHOD FOR PHOTOGRAPHIC OPTICAL SYSTEM

(75) Inventor: Hitoshi Hagimori, Ikoma (JP)

(73) Assignee: Minolta Co., Ltd., Osaka (JP)

( * ) Notice: Subject to any disclaimer, the term of this patent is extended or adjusted under 35 U.S.C. 154(b) by 4 days.

(21) Appl. No.: 09/957,414

(22) Filed: Sep. 20, 2001

(65) Prior Publication Data

US 2002/0036836 A1 Mar. 28, 2002

(30) Foreign Application Priority Data

Sep. 28, 2000 (JP) .................................. 2000-296575

(51) Int. Cl.[7] .......................... G02B 15/22; G03B 17/00
(52) U.S. Cl. ...................... 359/705; 359/693; 396/80; 396/85
(58) Field of Search .................. 359/705, 694, 359/693, 697, 698; 348/552; 396/80, 81, 85, 86

(56) References Cited

U.S. PATENT DOCUMENTS 5,267,085 A * 11/1993 Sasaki et al. ............... 359/694
5,850,577 A * 12/1998 Ito ............................. 359/705
6,449,102 B1 * 9/2002 Goto .......................... 359/705

FOREIGN PATENT DOCUMENTS

| JP | 08-294030 A | 11/1996 |
| JP | 10-065780 A | 3/1998 |
| JP | 11-136554 A | 5/1999 |

* cited by examiner

Primary Examiner—Loha Ben
Assistant Examiner—M. Hasan
(74) Attorney, Agent, or Firm—Sidley Austin Brown & Wood LLP

(57) ABSTRACT

A portable telephone 1 is provided with a body 2 and a camera unit 3. In the camera unit 3, photography is switched to macro photography by pressing a macro button 22 on the body 2. In this way, the convenience of the portable telephone 1 is improved because an object in the very near distance can be photographed. The camera unit 3 is constructed so as to be freely rotatable in a direction Rc on a shaft of a connector C. Accordingly, a user can freely modify the photography direction of the camera unit 3, thereby increasing the freedom of photography and providing greater improvement in the convenience of the portable terminal.

14 Claims, 12 Drawing Sheets

PORTABLE TERMINAL AND DRIVE METHOD FOR PHOTOGRAPHIC OPTICAL SYSTEM

This application is based on Patent Application No. 2000-296575 filed in Japan, the content of which is hereby incorporated by reference.

BACKGROUND OF THE INVENTION

1. Field of the Invention

The present invention relates to photographic art, and specifically relates to photographic art used by portable terminals such as portable telephones, personal digital assistants (PDA) and the like.

2. Description of the Related Art

It has become practical to provide an integrated or removable camera element for photography in portable terminals such as portable telephones, PDAs and the like, making it possible to transmit not only mutual voice information but also image information such as mutual display information when communicating remotely.

Using such a portable terminal may be inconvenient for a user, however, when photographing an object in the very near distance from the portable terminal due to the difficulty in achieving an appropriate focus.

Furthermore, when changing photography magnification using a photographic optical system having a zoom function for changing in steps the photography magnification by independently driving a plurality of lens units, there is often a mismatch in timing by which the respective lens units reach a position corresponding to each photography magnification. This situation is inconvenient because it takes a longer time to focus due to the generated focus divergence.

SUMMARY OF THE INVENTION

One object of the present invention is to provide a highly convenient portable terminal and drive method for a photographic optical system.

One aspect of the present invention is a portable terminal comprising an image pick-up element for acquiring an object image, a photographic optical system for forming an object image on the image pick-up element, and a moving mechanism for moving or modifying the structure, i.e., the position of the photographic optical system for macro photography.

Another aspect of the present invention is a portable terminal comprising an image pick-up element for acquiring an object image, a photographic optical system for forming an object image on the image pick-up element, and a focusing mechanism for moving or modifying the structure, i.e., the position of the photographic optical system for macro photography and setting an in-focus state.

Yet another aspect of the present invention is a driving method for driving a plurality of lens units comprising setting a first position of each lens unit for a first photography magnification, and setting a second position of each lens unit for a second photography magnification, and independently driving each lens unit to modify the photography magnification from the first photography magnification to the second photography magnification, in which setting the respective moving speeds of lens units in accordance with the moving distance of each lens unit moving from the first position to the second position, and driving each lens unit at the moving speed of the respective lens unit.

Still another aspect of the present invention is a driving method for driving a plurality of lens units comprising setting a first position of each lens unit for a first photography magnification, and setting a second position of each lens unit for a second photography magnification, and setting a third position of each lens unit for a third photography magnification, and independently driving each lens unit to modify the photography magnification from the first photography magnification through the second photography magnification to the third photography magnification, in which driving each lens unit from the first position to the second position, stopping the movement of a lens unit that reaches the second position, and driving each lens unit from the second position to the third position after all lens units have arrived at the second position.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

First Embodiment

Essential Structure of Portable Telephone

Figure 1:
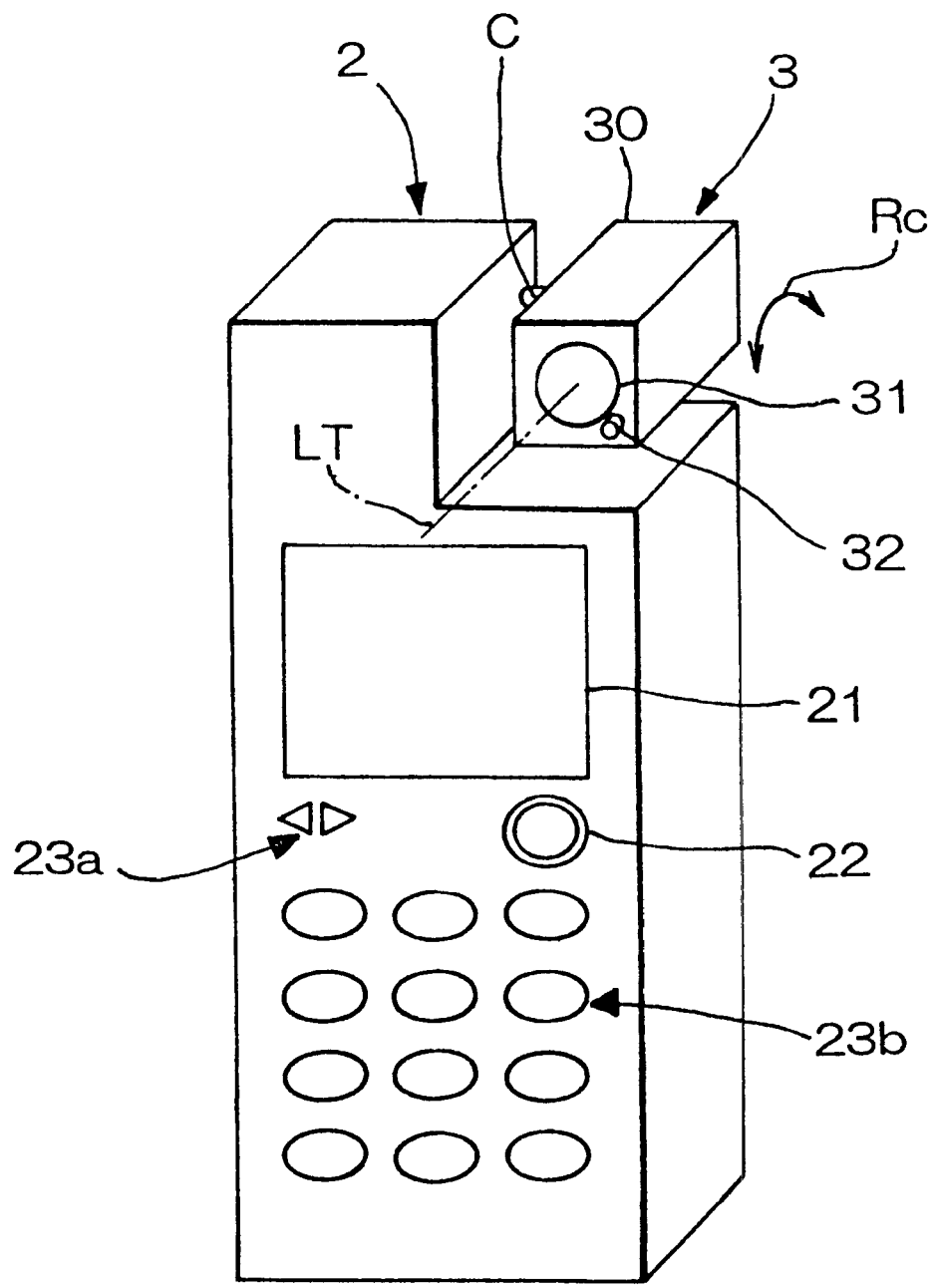
FIG. 1 shows a first embodiment of the present invention, an external view of a portable telephone.

FIG. 1 shows an exterior view of a portable telephone 1.

The portable telephone 1 is provided with a body 2 and a camera unit 3, and functions as a portable terminal.

The body 2 is a part having the communication function of the portable terminal, and externally has a display unit 21 disposed in the center of the front surface, macro button 22, two zoom buttons 23a, and switch group 23b for inputting the number of the communication partner.

The display unit 21 comprises a liquid crystal display, and displays images photographed by the camera unit 3, images received from a communication partner and the like.

The macro button 22 switches to macro mode photography described later.

The zoom buttons 23a increase or decrease the photography magnification when photographing an object using the camera unit 3 when a zoom button 23a is pressed by a user.

The camera unit 3 is provided with housing 30 having a rectangular shape, a photography window 31 provided on the front of the housing, and a contact sensor 32, and the housing 30 is connected to the body 2 by a connector C.

The contact sensor 32 mechanically detects when the leading end of the sensor presses against an object, and generates a contact detection signal.

The connector C has a cylindrical shape, supports the camera unit 3 so as to be freely rotatable in a direction Rc about a horizontal axis relative to the body 2, and can rotate the camera unit 3 so as to face in the opposite direction of the direction of the display screen of the display unit 21. Within the connector C is wiring for transmitting image signals from a image sensing element 40 described later to the body 2.

Behind the photography window 31 is provided an image sensing unit 4 (described below) along an optical axis LT.

Figure 2:
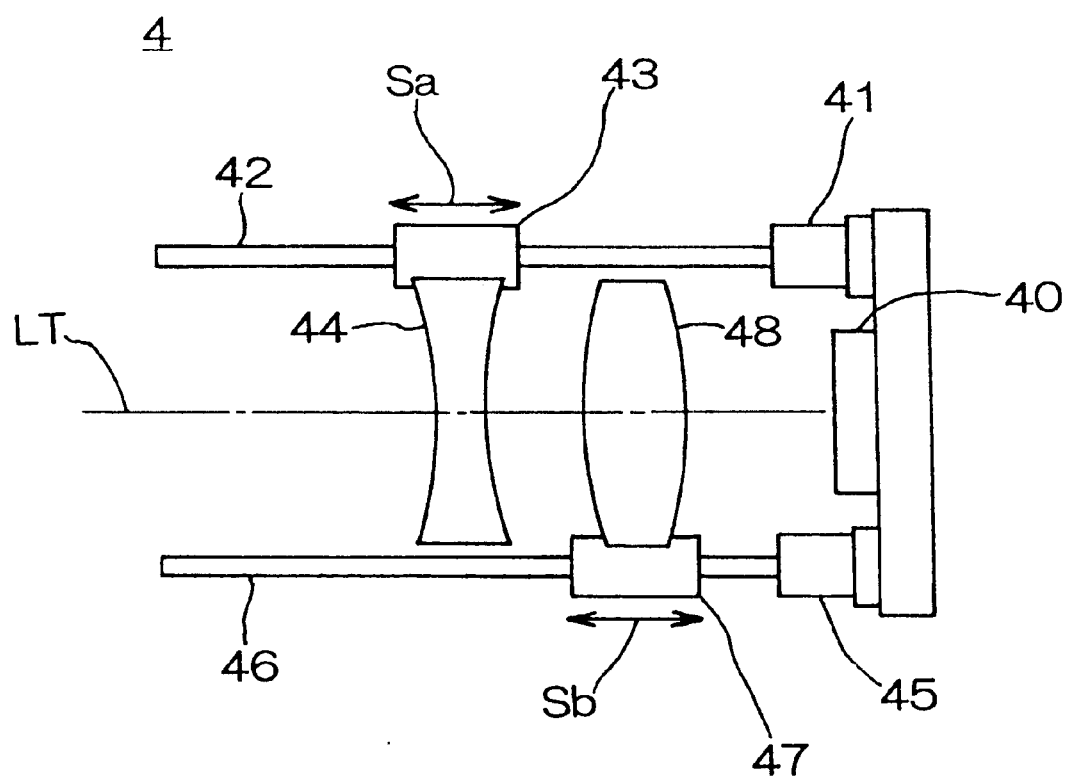
FIG. 2 is a side view showing the essential structure of the image pick-up element in the portable telephone.

The essential structure of the image sensing unit 4 is described below based on FIG. 2.

The image sensing unit 4 has an image sensing element 40 for taking images, and is further provided with a piezoelectric element 41, a guide shaft 42 connected to an endface of the piezoelectric element 41, a slider 43 which is movable along the guide shaft 42, and a first lens unit 44 supported by the slider 42. Furthermore, the image sensing unit 4 is provided with a piezoelectric element 45, guide shaft 46, slider 47 of identical structure, and second lens unit 48.

The image sensing element 40 has a charge-coupled device (CCD), and photoelectrically converts an object image formed by the first lens unit 44 and the second lens unit 48.

The piezoelectric elements 41 and 45 comprise laminate piezoelectric ceramics or the like, and function as electromotive actuators which expand and contract in the optical axis LT direction when a voltage is applied from an external source. In this way the guide shafts 42 and 46 oscillate in the optical axis LT direction, i.e., the length direction, in conjunction with the expansion and contraction of the piezoelectric elements 41 and 45.

The guide shafts 42 and 46 have a square rod shape and extend in the optical axis LT direction, and have an embedded magnetic pattern in the length direction.

The sliders 43 and 47 are oscillatable in directions Sa and Sb relative to the guide shafts 42 and 46, and have embedded magnetic resistance patterns at locations corresponding to the previously mentioned magnetic patterns. Positions of the sliders 43 and 47, i.e., the positions of the first lens unit 43 and the second lens unit 48, can be detected by the combination of the magnetic resistance pattern elements and the magnetic patterns of the guide shafts 42 and 46.

The sliders 43 and 47 have a shape which covers the circumference of the guide shafts 42 and 46, so as to generate a uniform friction force by contact with the surface of the guide shafts 42 and 46.

The first lens unit 44 is a concave lens system, which functions as a compensator for focus position correction, and is used for focusing. The second lens unit 48 is a convex lens system, and functions as a variator for modifying the photography magnification. The combination of the first lens unit 44 and the second lens unit 48 functions as a zoom lens. The image formation state on the image sensing element 40 can be maintained while varying the magnification by specific operation of the respective first lens unit 44 and second lens unit 48.

In the image sensing unit 4 of the aforesaid structure, when the piezoelectric elements 41 and 45 are stopped or moderately expanded and contracted relative to the guide shafts 42 and 46, the position of the sliders 43 and 47 does not change relative to the guide shafts 42 and 46 because a force in excess of the friction force does not act on the sliders 43 and 47. In contrast, when the piezoelectric elements 41 and 45 perform a momentary expansion contraction operation, the positions of the sliders 43 and 47 relative to the guide shafts 42 and 46 move in the opposite direction to the expansion and contraction direction of the piezoelectric elements 41 and 45 due to the action of inertia exceeding the friction force relative to the sliders 43 and 47. In this way the first lens unit 44 and the second lens unit 48 can be driven, and the position of each lens unit 44 and 48 can be controlled, such that the photography magnification can be modified and a focusing operation can be performed so as to enable macro photography described later.

The function block of the portable telephone 1 is described below based on FIG. 3.

The portable telephone 1 is provided with the previously mentioned display unit 21, macro button 22, a controller 20 connected to an operating portion 24 comprising zoom buttons 23a and switch group 23b, and a signal processor 25, image memory 26, communication portion 27, transmitting portion 28, and power source 29 electrically connected to controller 20.

The signal processor 25 converts analog image signals output from the image sensing element 40 to digital signals, and performs image processing such as gamma correction and the like.

The image memory 26 independently stores image data acquired by the image sensing element 40 and processed by the signal processor 25.

The communication portion 27 has a microphone and speaker so as to be capable of communicating with a communicaiton partner.

The transmitting portion 28 has an antenna, and functions as an interface for wireless communicaiton of voice and image data.

The power source 29 has a compact battery, and supplies power to the controller 20 and supplies power to each part via the controller 20.

The controller 20 has a CPU 201 and a memory 202, and organically controls each part for general control of the operation of the portable telephone 1.

The camera unit 3 of the portable telephone 1 is provided with a first driver 34 for driving the first lens unit 44 having the piezoelectric element 41, a second driver 35 for driving the second lens unit 48 having the piezoelectric 45, and a detector 36 having the contact sensor 32.

When contact with an object is detected in the contact sensor 36, a contact detection signal is generated in response to the contact detection, and photography is switched to the macro mode in the same way as the macro button 22 is pressed.

Macro Photography

When a user presses the macro button 22, photography is switched to the macro mode which enables photography at a very near distance, e.g., under conditions of 30 cm or less from the object. This macro photography is described below.

Figure 4A:
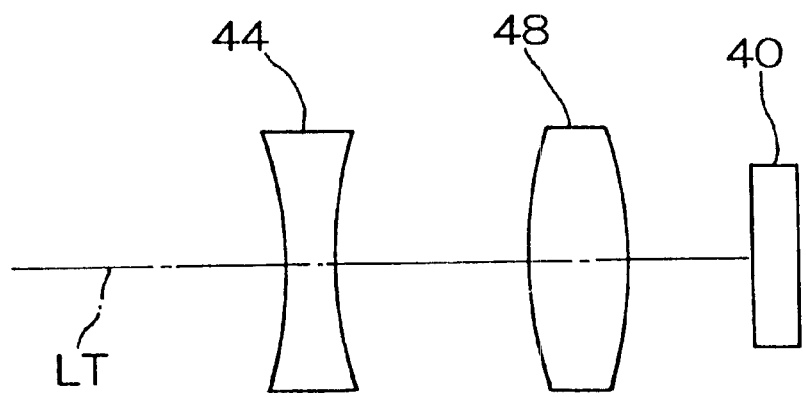
FIGS. 4A and 4B illustrate the lens operation when the portable telephone of FIG. 1 is used for photography.
Figure 4B:
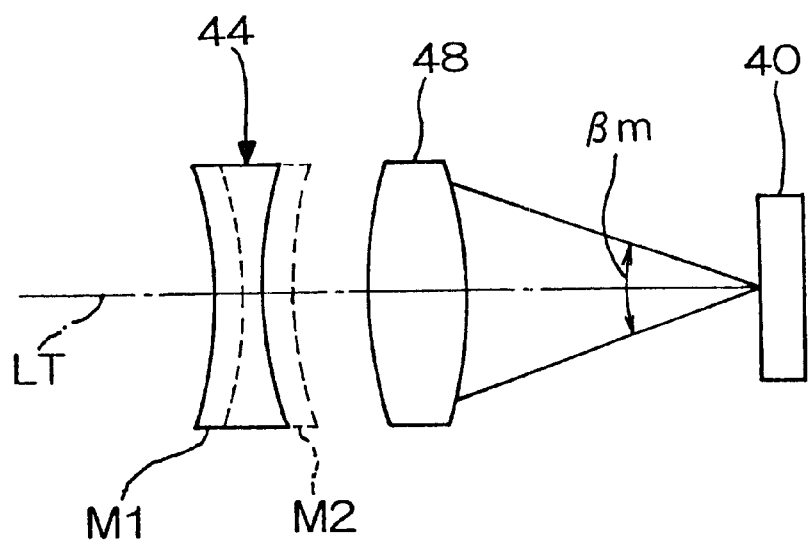

FIGS. 4A and 4B illustrate the operation of the lens units 44 and 48 during photography. FIG. 4 shows the positional relationships among the first lens unit 44, second lens unit 48, and image sensing element 40.

When photography is switched to the macro mode, for example, the positional relationship of the first lens unit 44 and the second lens unit 48 shown in FIG. 4A is modified to the lens structure shown in FIG. 4B by moving each lens unit 44 and 48. In FIG. 4B, after the first lens unit 44 is moved to the lens position M1 indicated by the dashed line, the first lens unit 44 is moved to the lens position M2 indicated by the solid line to attain the lens structure of the macro mode.

The position M1 of the first lens unit 44 is a photography position of maximum photography magnification in normal photography in combination with the second lens unit 48. Since an object in the very near distance is not focused in this positional relationship, the first lens unit 44 is moved to the position M2 in the object direction. Focus can be achieved on an object in the very near distance by moving the first lens unit 44 to the position M2 which is different than normal photography.

The photography magnification is dependent on the angle Bm of the light from the second lens unit 48 forming an image in the focal plane in the image sensing element 40, however, in the image sensing unit 4 of the present embodiment, a specific macro photography magnification can be maintained to perform macro photography because a fixed distance, i.e., a fixed angle Bm, is maintained between the second lens unit 48 and the image sensing element 40 during macro photography.

Figure 5:
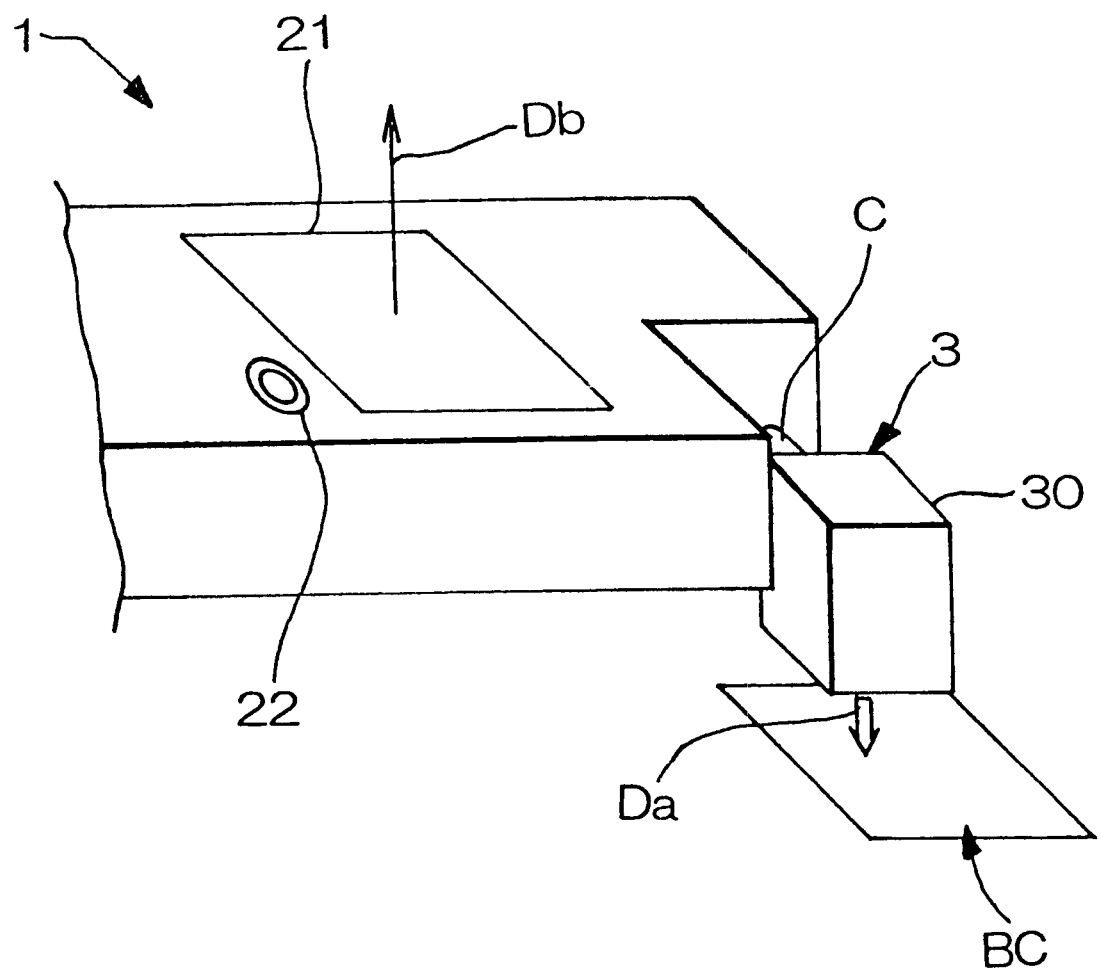
FIG. 5 shows an example of the use of the portable telephone of FIG. 1.

Furthermore, photography is switched to macro photography when the contact sensor 22 detects contact of the camera unit 3 and an object. For example, an object such as, for example, a bar code BC in the very near distance such that contact is made with the camera unit 3 can be photographed by, for example, rotating the camera unit 3 180 degrees from the state shown in FIG. 1, such that the photography direction Da, i.e., the direction extending along the optical axis LT, faces the opposite direction relative to the display screen direction Db of the display unit 21, as shown in FIG. 5. In this case, a photographic image of the object BC is displayed on the display unit 21, allowing a user to verify whether or not the photograph is satisfactory by viewing the display unit 21. In this instance the photographic result displayed on the display unit 21 is satisfactory. Since the camera unit 3 has this rotatable structure, a user can turn the camera unit 3 to face in a desired photography direction, greatly increasing the degree of freedom for photography.

The convenience of the portable telephone is improved because macro photography is possible in a portable telephone which characteristically has excellent portability by the previously described structure and operation of the portable telephone 1.

Second Embodiment

Essential Structure of Portable Telephone

The portable telephone 1A of the second embodiment is provided with a structure identical to that of the portable telephone 1 with the exception that the structure and control of the camera unit 3A are different.

Figure 6:
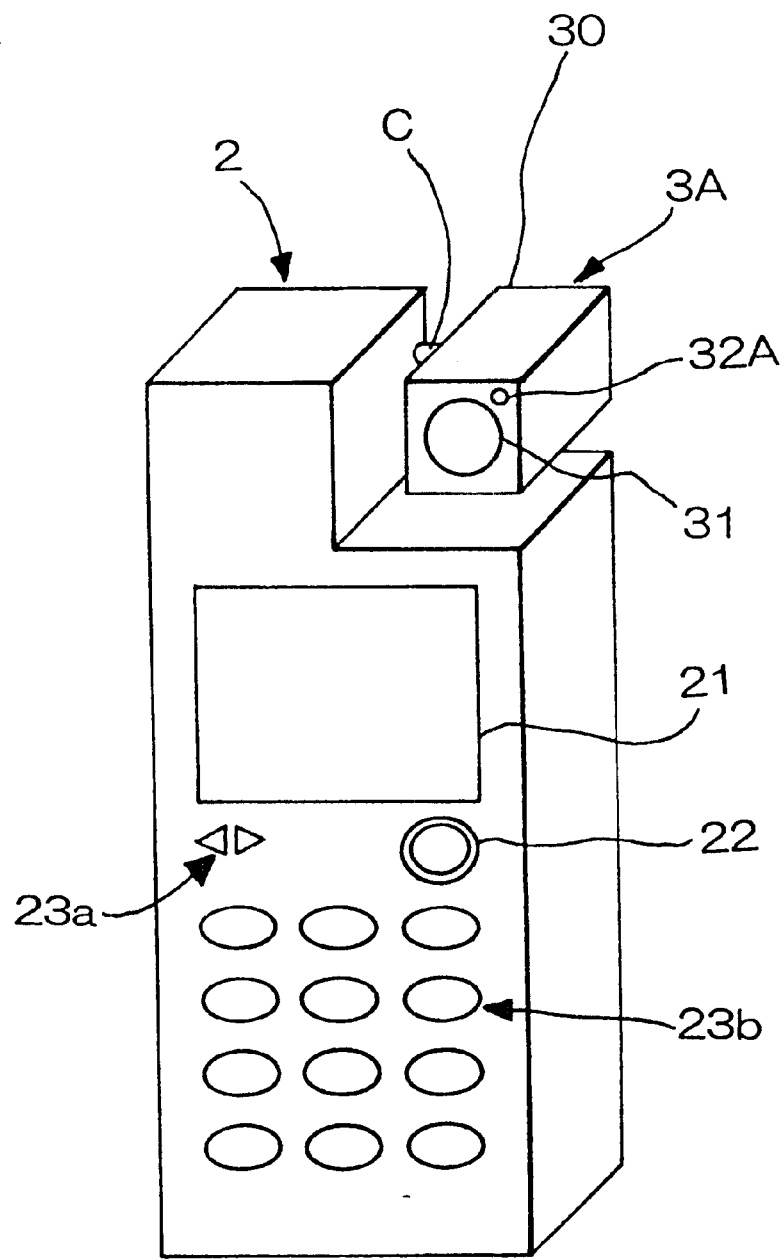
FIG. 6 shows a second embodiment of the present invention, an external view of a portable telephone.

The exterior view of the portable telephone 1A is described below based on FIG. 6.

A camera unit 3A is provided with a distance measuring sensor 32A in place of the contact sensor 32 of the camera unit 3 in the first embodiment.

The distance measuring sensor 32A measures the photographic distance to an object using, for example, a non-TTL passive method, and generates a distance signal.

Figure 3:
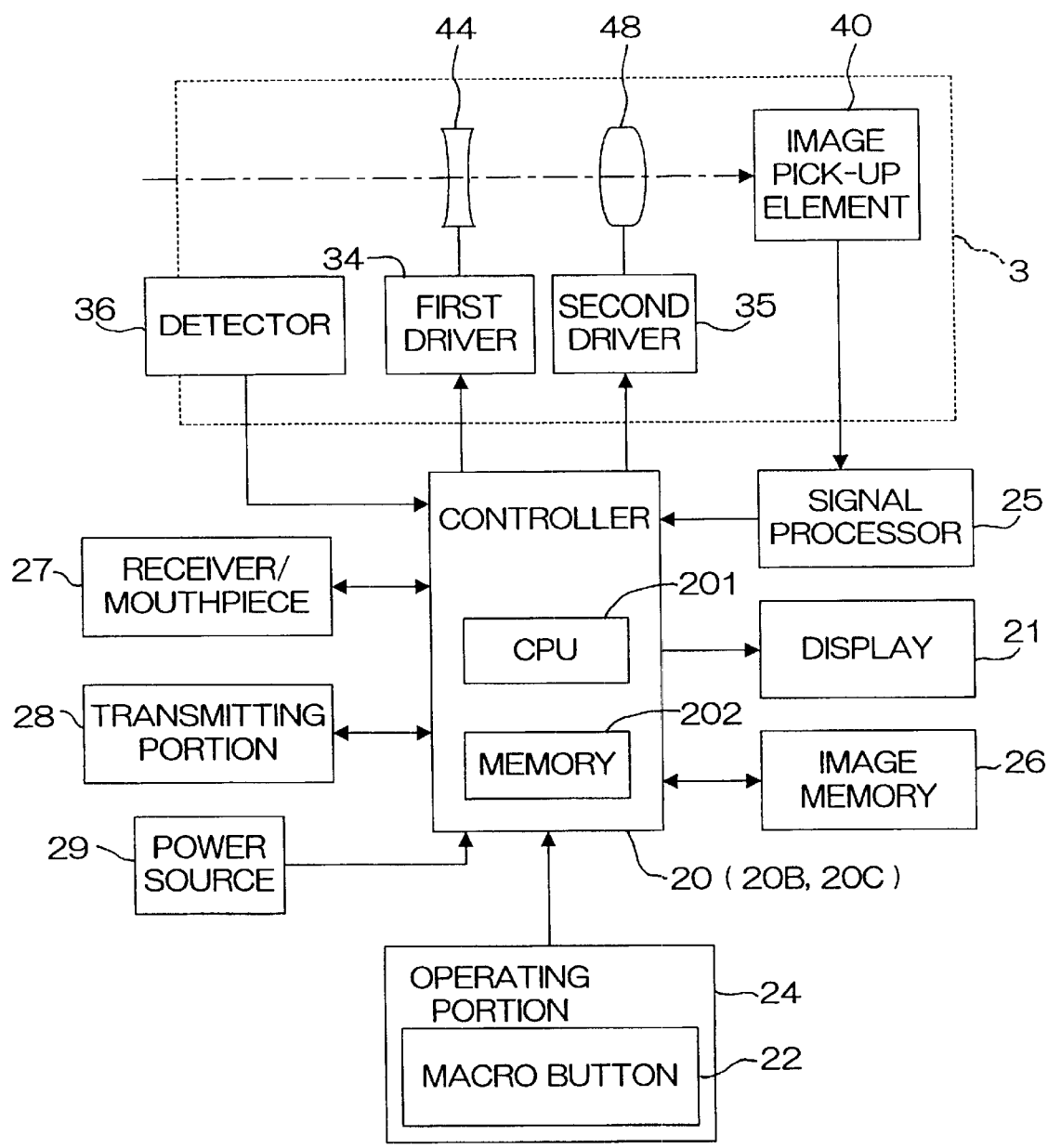
FIG. 3 shows the function blocks of the portable telephone.

The function block of the portable telephone 1A is identical to the function block shown in FIG. 3, however, the detector 36 has the distance measuring sensor 32A rather than the contact sensor 32.

In this portable telephone 1A, when macro photographing a bar code BC as shown in FIG. 5, a distance signal from the distance measuring sensor 32A is compared to a specific threshold distance (e.g., 30 cm), and when the distance from the camera unit 3A to the object is a very near distance less than the threshold distance, photography is automatically switched to the macro mode. That is, convenience is improved even more because photography is switched to macro photography if nearness to an object is detected even when the camera unit 3A does not contact the object.

The portable telephone 1A differs from the first embodiment in that it is provided with a structure capable of photography at variable photography magnification in macro photography.

Figure 7A:
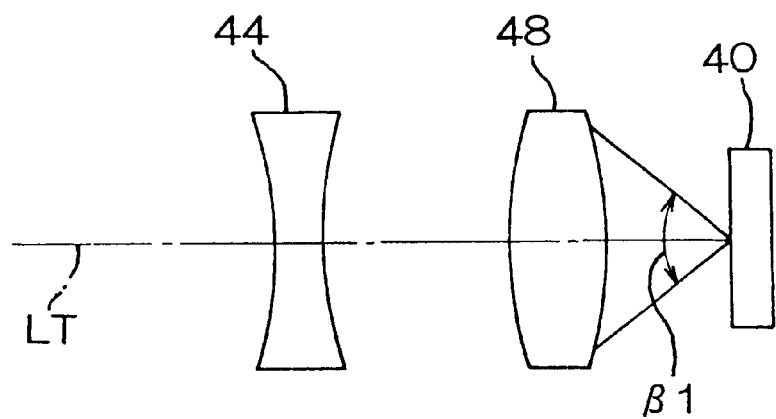
FIGS. 7A, 7B, 7C illustrate the lens operation when the portable telephone of FIG. 6 is used for photography.
Figure 7B:
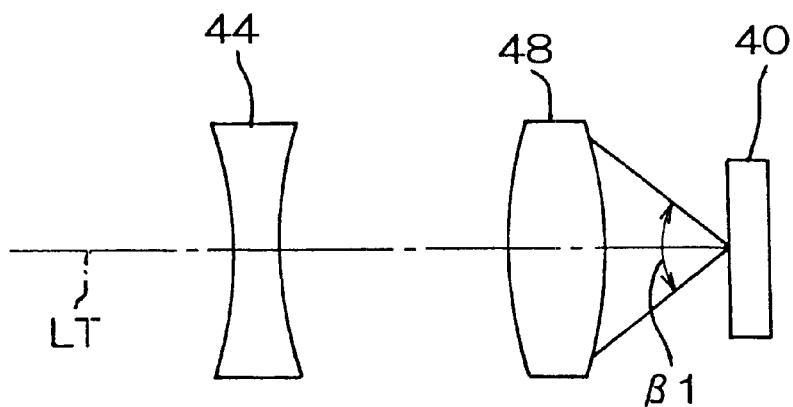

FIG. 7 illustrates the operation of each lens unit 44 and 48 during photography. FIG. 7 shows the positional relationship of the first lens unit 44, second lens unit 48, and image sensing element 40.

When photography is switched to macro photography by pressing the macro button 22 or the like, the positional relationship of the first lens unit 44 and the second lens unit 48 as shown, for example in FIG. 7A is moved a fixed amount in the object direction while the position of the second lens unit 48 is maintained so as to focus the object in the very near distance. In this case, since photography is switched to the macro mode while maintaining the angle $\beta 1$ of the light from the second lens unit 48 forming an image on the focal plane of the image sensing element 40, and the photography magnification from before the switch is maintained as macro photography is enabled.

Figure 7C:
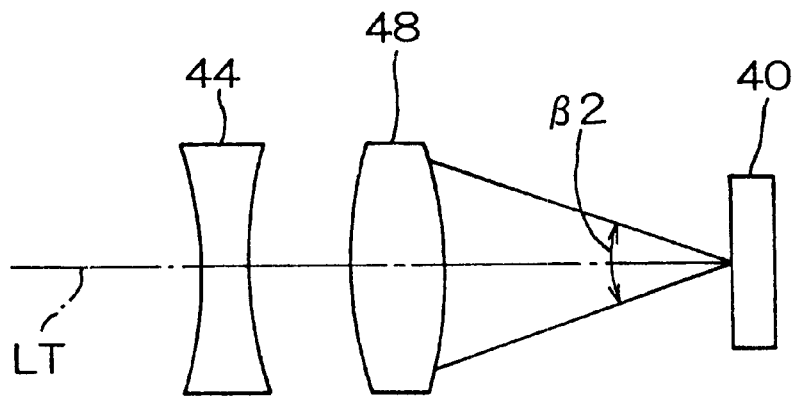

When the zoom button 23a is pressed after switching to the macro mode, the second lens unit 48 is moved, for example, as shown in FIG. 7C, and the angle $\beta 1$ is modified to angle $\beta 2$. In this way the photography magnification can be modified in macro photography. At this time it is desirable that the position of the first lens unit 44 is adjusted in accordance with the distance to the object measured by the distance measuring sensor 32A to attain an in-focus state.

The portable telephone 1A is provided with a structure capable of automatic focusing by the controller 20 adjusting the positions of the first lens unit 44 and second lens unit 48 in accordance with the distance to an object measured by the distance measuring sensor 32A not only in macro photography, but also in normal photography.

The structure and operation of the portable telephone 1A is therefore identical to the portable telephone 1 of the first embodiment. Furthermore, the convenience of the portable telephone is improved by providing the distance measuring sensor 32A which allows automatic focusing in normal photography.

Third Embodiment

Essential Structure of Portable Telephone

The portable telephone 1B of the third embodiment is provided with a structure identical to the portable telephone 1 of the first embodiment with the exception that the structure of the controller shown in FIG. 3 is different.

In the controller 20B of the portable telephone 1B, programs are stored in the memory 202 for accomplishing the operation of each lens unit 44 and 48 in modifying the photography magnification described later.

The portable telephone 1B is provided with a structure capable of step-like modification of the zoom point, i.e., photography magnification, by pressing the zoom button 23a. Furthermore, the portable telephone 1B is provided with a structure capable of independently driving the first lens unit 44 and the second lens unit 48 (refer to FIG. 2).

The position of each lens unit 44 and 48 at each zoom point is described below based on FIG. 8.

The broken lines Z1–Z5 represent each zoom point set at 10 degree intervals from a field angle of 60 degrees to 20 degrees, for example, to attain a constant change of field angle.

The points P1–P5 and points Q1–Q5 represent the respective positions of the first lens unit 44 and second lens unit 48 at each zoom point Z1–Z5.

The position information of each lens unit 44 and 48 is stored in the memory 202 of the controller 20B.

Operation of Each Lens Unit 44 and 48

Figure 9:
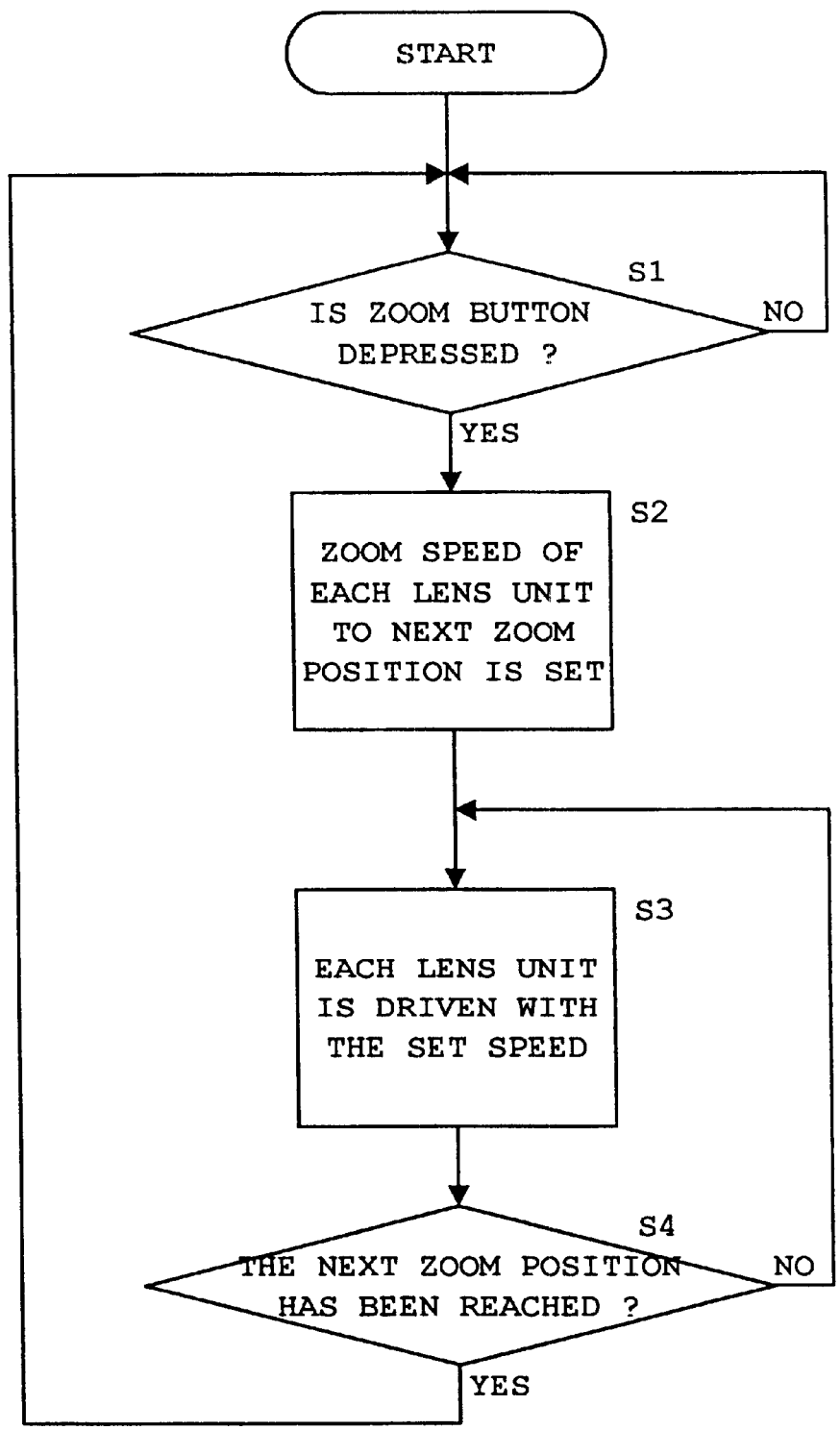
FIG. 9 is a flow chart illustrating the operation for modifying the photography magnification in the third embodiment.

The operation of modifying the photography magnification in the portable telephone 1B is described below based on the flow chart of FIG. 9. Specifically, the modification from zoom point Z1 to Z5 is described by way of example.

In step S1, a check is made to determine whether or not a user has pressed the zoom button 23a. When the zoom button 23a has been pressed, the routine advances to step S2.

In step S2, the moving speed is set for each lens unit 44 and 48 to the next zoom point. This operation is described by way of example when the photography magnification is modified from zoom point Z1 to zoom point Z2.

Figure 8:
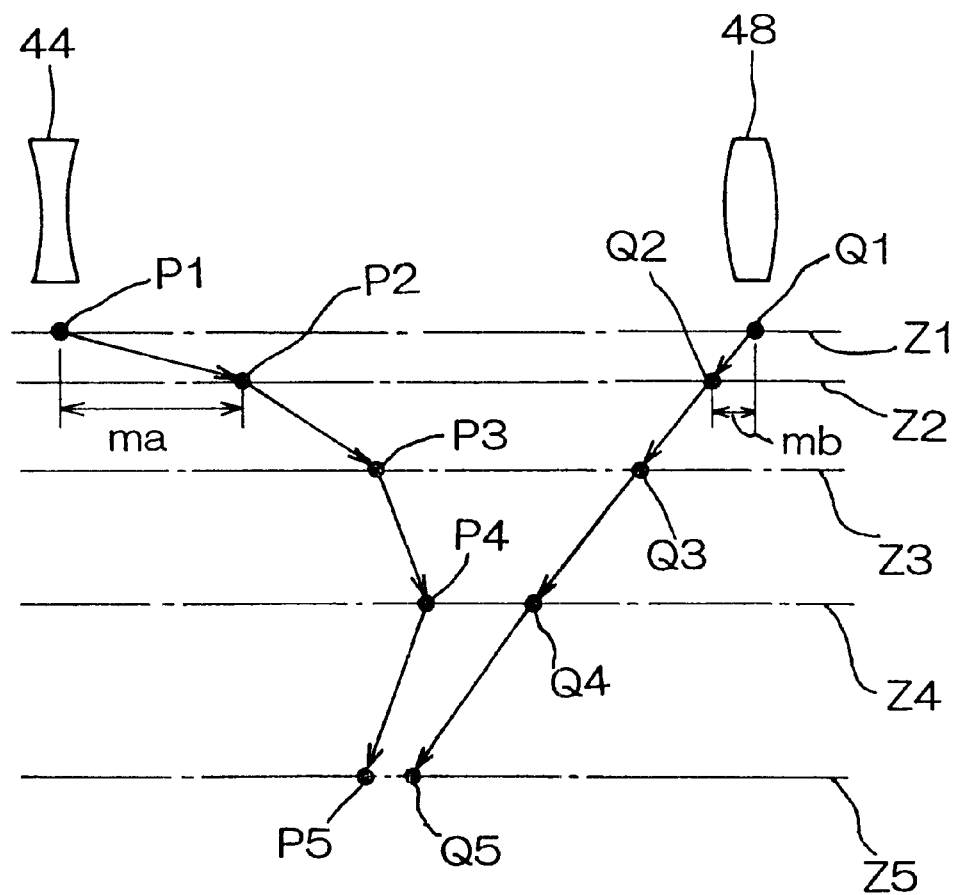
FIG. 8 shows a third embodiment of the present invention, and shows the lens positions at each zoom point.

When the moving distance of the first lens unit 44 is designated ma and the moving distance of the second lens unit 48 is designated mb, and the moving speed of the first lens unit 44 is designated va and the moving speed of the second lens unit 48 is designated vb, as shown in FIG. 8, such that the relationship va/vb=ma/mb obtains, the moving speed of each lens unit 44 and 48 can be calculated by the CPU 201. In this way the moving speed of each lens unit 44 and 48 becomes a value proportional to the respective moving distance.

In step S3, each lens unit 44 and 48 is driven at the moving speed va or vb set in step S2.

In step S4, a determination is made as to whether or not each lens unit 44 and 48 has reached the next zoom point, i.e., zoom point Z2. When the lens units have reached the next zoom point, the routine returns to step S1, and the operation from steps S1 to S4 are repeated. Specifically, an operation identical to the operation for modifying the photography magnification from zoom point Z1 to Z2 is repeated from zoom point Z2 to Z5. However, if the lens units 44 and 48 have not reached the next zoom point, the routine returns to step S3.

In step S4, if each lens unit 44 and 48 are moved at the moving speed set in step S2, the lens units 44 and 48, which started simultaneously at the first positions P1 and Q1 at zoom point Z1, simultaneously reach the second positions P2 and Q2 at zoom point Z2.

Since the arrival timing of each lens unit 44 and 48 at each zoom point is equal, zooming is accomplished while suppressing focal point divergence, thereby improving the convenience during photography.

Fourth Embodiment

Essential Structure of Portable Telephone

The portable telephone 1C of the fourth embodiment is provided with a structure identical to that of the portable telephone 1 of the first embodiment with the exception that the structure of the controller shown in FIG. 3 is different.

In the controller 20C of the portable telephone 1C, programs are stored in the memory 202 for accomplishing the operation of each lens unit 44 and 48 in modifying the photography magnification described later.

The portable telephone 1C is provided with a structure capable of step-like modification of the zoom point, i.e., photography magnification, by pressing the zoom button 23a, similar to the third embodiment. Furthermore, the portable telephone 1C is provided with a structure capable of independently driving the first lens unit 44 and the second lens unit 48, similar to the third embodiment (refer to FIG. 2).

Figure 10:
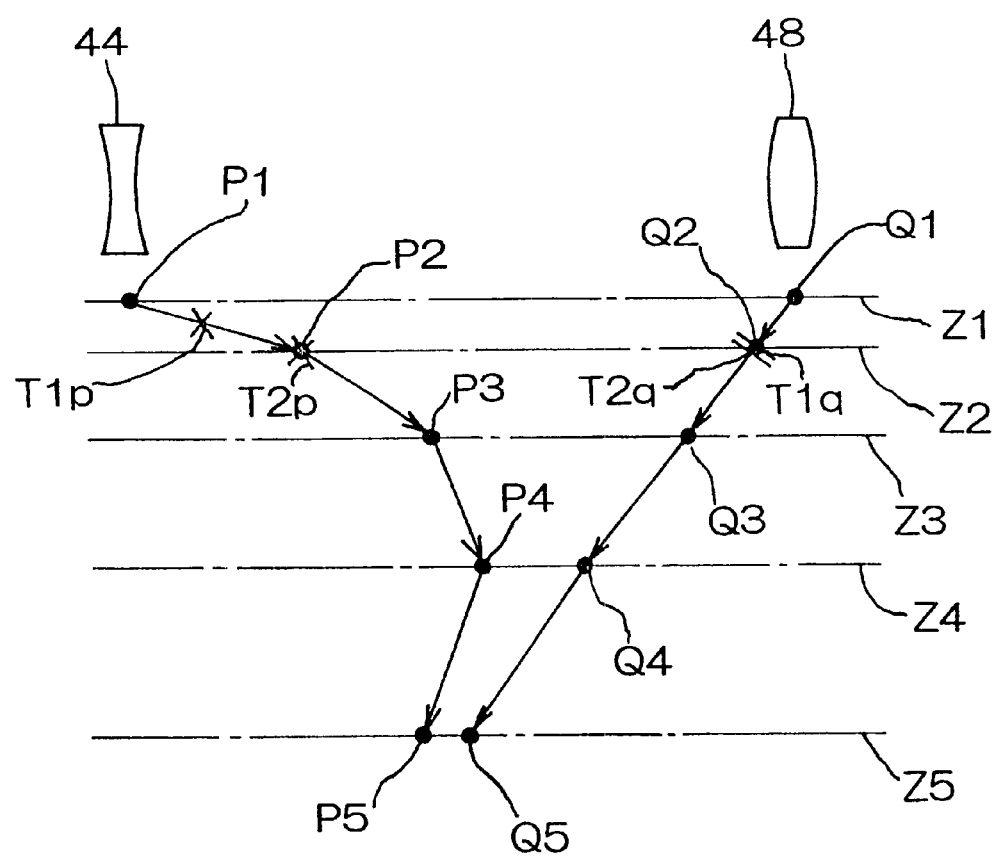
FIG. 10 shows a fourth embodiment of the present invention, and shows the lens positions at each zoom point.

FIG. 10 shows the position of each lens unit 44 and 48 at each zoom point.

The broken lines Z1–Z5 represent each zoom point set at 10 degree intervals from a field angle of 60 degrees to 20 degrees, for example, to attain a constant change of field angle, similar to the third embodiment.

The points P1–P5 and points Q1–Q5 represent the respective positions of the first lens unit 44 and second lens unit 48 at each zoom point Z1–Z5.

Operation of Lens Units 44 and 48

Figure 11:
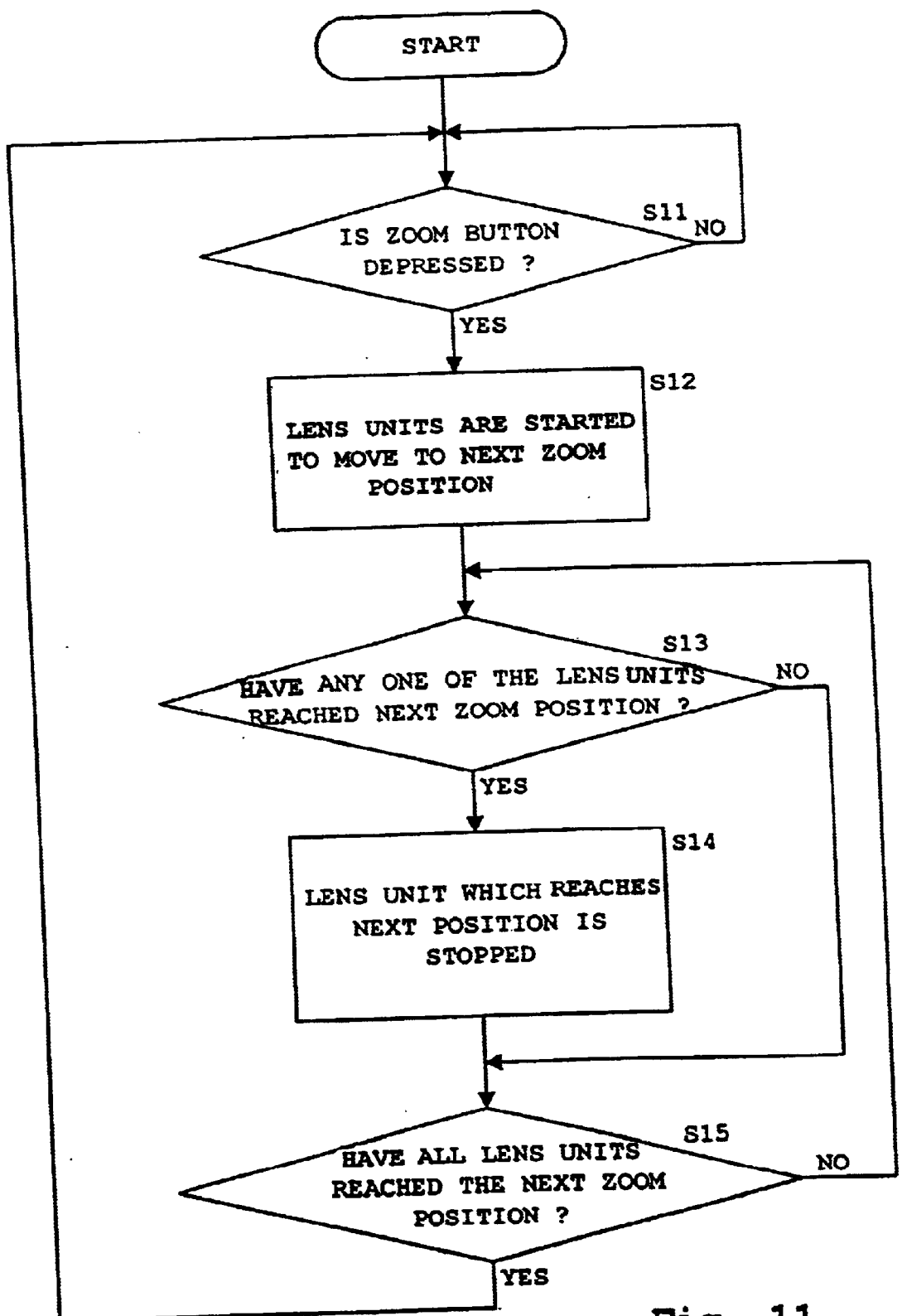
FIG. 11 is a flow chart illustrating the operation for modifying the photography magnification in the fourth embodiment.

FIG. 11 is a flow chart illustrating the operation of modifying the photography magnification in the portable telephone 1C. This operation is described by way of specific example of the modification from zoom point Z1 to Z5.

In step S11, a determination is made as to whether or not a user has pressed the zoom button 23a. When the zoom button 23a has been pressed, the routine advances to step S12.

In step S12, the movement of the lens units 44 and 48 starts to the next zoom point, i.e., from zoom point Z1 to zoom point Z2. In this case, the moving speeds of the lens units are set approximately equal, unlike the third embodiment.

In step S13, a determination is made as to whether or not either lens unit has reached the next zoom point, i.e., the second position P2 or Q2 at zoom point Z2. When either lens unit has reached the next zoom point, the routine advances to step S14, whereas when neither has reached the next zoom point, the routine advances to step S15.

In step S14, the lens unit which has arrived at either the second position P2 or Q2 is stopped. Since the moving distance (Q1–Q2) of the second lens unit 48 is shorter than the moving distance (P1–P2) of the first lens unit 44 when moving from the zoom point Z1 to Z2, the second lens unit 48 arrives first at the second position Q2, and the second lens unit 48 is stopped. As shown in FIG. 10, the first lens unit 44 only moves until T1p and does not reach the second position P2 at the arrival time T1 of the second lens unit 48 at the second position Q2. The stopped time of the second lens unit 48 is desirably set at approximately 10–500 ms in consideration of operational performance.

In step S15, a determination is made as to whether or not the lens units 44 and 48 have all arrived at the next zoom point, i.e., the second positions P2 and Q2 at zoom point Z2.

As shown in FIG. 10, since the second lens unit 48 has already stopped at the second position Q2 (T2q) at the arrival time T2 of the first lens unit 44 at the second position P2, the determination is essentially whether or not the first lens unit 44 has arrived at the second position P2. When all lens units have arrived, the routine returns to step S11, and the operation of steps S11–S15 are repeated. Specifically, an operation identical to the operation for modifying the photography magnification from zoom position Z1 to Z2 is repeated for zoom positions Z2–Z5, and each lens unit 44 and 48 arrives at the target fifth positions P5 and Q5. However, when all lens units 44 and 48 have not arrived, the routine returns to step S13.

In this way, in the operation for modifying the photography magnification from zoom point Z1 to Z5, zooming is accomplished while suppressing focal point divergence, thereby improving the convenience during photography because focusing is accomplished in the intermediate range at zoom points Z2, Z3, Z4.

Modifications

Figure 12A:
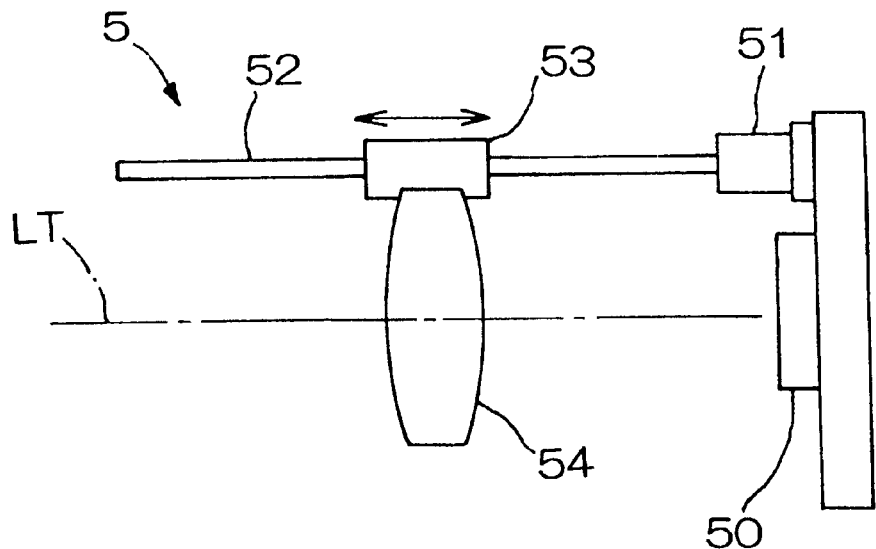
FIGS. 12A and 12B show a modification of the present invention, and are side views showing the essential structure of the image pick-up element of the portable telephone.
Figure 12B:
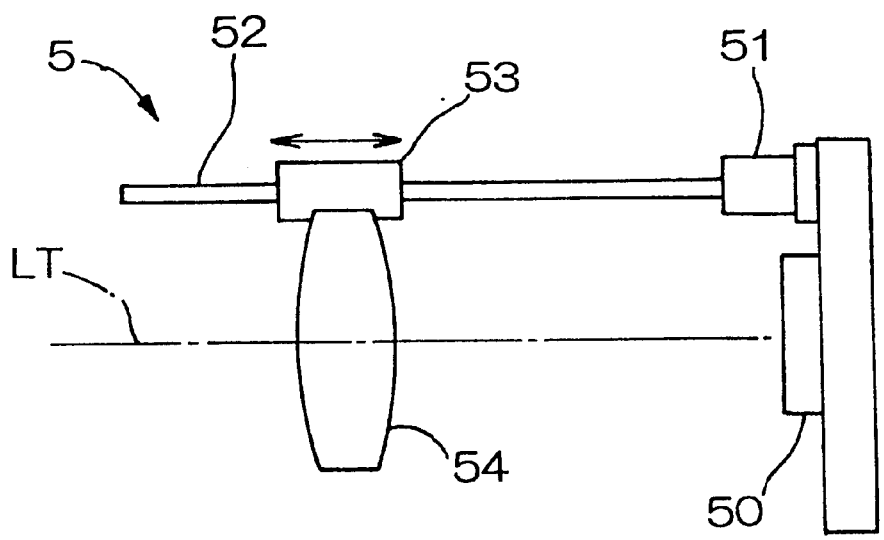

The structure for driving the two lens units described in the aforesaid embodiments is not compulsory, inasmuch as the structure for driving one lens unit may be used as in the image sensing unit 5 shown in FIGS. 12A and 12B.

The image sensing unit 5 has an image sensing element 50 identical to the image sensing element 40 (FIG. 2), and has a piezoelectric element 51, guide shaft 52 connected to an endface of the piezoelectric element 51, slider 53 moving along the guide shaft 52, and a convergent system lens unit 54 supported on the slider 53.

The image sensing unit 5 switches to the macro mode by moving the lens unit 54 to the object side as shown in FIG. 12B from a state focused on an object in the far distance as shown in FIG. 12A, for example, by pressing the macro button.

In this way, the convenience of the portable telephone is improved by allowing macro photography.

When changing to the macro mode, the structure for driving each lens unit electromotively to a macro photography position is not compulsory, inasmuch as a mechanism for manually moving the lens unit may be provided.

The structure of each embodiment is applicable not only to portable telephone, but also to portable terminals such as a PDA (personal digital assistant) and the like.

In the third embodiment, the structure for sequentially calculating the setting of the moving speed by the CPU 201 is not compulsory inasmuch as, for example, set values for each moving speed may be stored in memory 202 and read out for the operation.

Although each lens unit is constructed as a single element lens, the lens unit may be constructed as a plurality of lenses.

In each embodiment, the structure for detecting the position of the lens units, i.e., the position of the sliders 43 and 47, magnetically is not compulsory, inasmuch as the position may be optically detected using a photoreflector or the like.

In the drive unit for driving the lens, the piezoelectric element is not compulsory inasmuch as another electromechanical conversion element may be used. Furthermore, a motor or other form of actuator may be used.

As described above, macro photography is possible and the convenience of the portable terminal is improved because the photographic optical system can be modified to a structure for macro photography.

Convenience is improved even more if the structure of the photographic optical system is modified by an electromotive actuator.

Greater freedom in photography is attained if a connector is provided for connecting the a camera unit to the body so as to be freely rotatable.

If the camera unit is rotatable such that the photography direction faces a direction opposite the display screen direction of the display unit, the photographic image can be verified on the display unit while photographing an object.

When the photographic direction of the camera unit faces a direction opposite the display screen direction of the display unit, photography can be switched to macro photography with a suitable timing by modifying the photographic optical system to a structure for macro photography.

Photography can be switched to macro photography with a suitable timing by modifying the photographic optical system to a structure for macro photography in accordance with a contact detection signal generated by detection of contact with an object.

Photography can be switched to macro photography with a suitable timing by modifying the photographic optical system to a structure for macro photography in accordance with an object distance.

The convenience of the portable terminal is improved by attaining a focused state by modifying the photographic optical system to a structure for macro photography.

Zooming can be accomplished while suppressing focal point divergence, thereby improving the convenience during photography by driving each lens unit at a respective moving speed set in accordance with the moving distance of the respective lens unit from a first position to a second position.

Alternatively, the movement of a lens unit which has reached a second position may be stopped, and after all lens units have reached the second position, all lens units may be moved to a third position. As a result, zooming is accomplished while suppressing focal point divergence, thereby improving the convenience during photography.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A portable terminal comprising:

a body having a communication function;

an image pick-up element for acquiring an object image data;

an optical system for forming an object image on the image pick-up element;

a camera housing the image pick-up element and the optical system;

a connector which connects the camera and the body; and a moving mechanism for moving the optical system to a lens position for macro photography.

2. The portable terminal as claimed in claim 1, wherein the moving mechanism moves the optical system by an electromotive actuator.

3. The portable terminal as claimed in claim 2, wherein the macro photography is accomplished in a specific macro photography magnification.

4. The portable terminal as claimed in claim 3, wherein the optical system comprises at least a front lens unit and a rear lens unit;

wherein the moving mechanism includes;

a first moving mechanism for driving the front lens unit; and a second moving mechanism for driving the rear lens unit;

and wherein the optical system is moved to a position by driving the front lens unit and the rear lens unit.

5. The portable terminal as claimed in claim 2, wherein the macro photography is accomplished in which the macro photography magnification is variable.

6. The portable terminal as claimed in claim 1, wherein said connector rotatably connects the camera and the body.

7. The portable terminal as claimed in claim 6, wherein the body includes;

a display capable of displaying on a display screen a photographic image acquired by the image pick-up element; and the connector is capable of rotating the photography direction of the camera in a reverse direction relative to the display screen direction of the display.

8. The portable terminal as claimed in claim 7, wherein the moving mechanism moves the optical system for macro photography when the camera faces the opposite direction to the display screen direction of the display.

9. The portable terminal as claimed in claim 6, wherein the camera has a detector for detecting contact with an object, and generating a contact detection signal; and wherein the moving mechanism moves the optical system for macro photography in response to the contact detection signal.

10. The portable terminal as claimed in claim 6, wherein the camera has a distance detector for measuring a distance to an object; and wherein the moving mechanism moves the optical system in accordance with the measured distance.

11. A portable terminal comprising:

a body having a communication function;

an image pick-up element;

an optical system for forming an object image on the image pick-up element;

a camera housing the image pick-up element and the optical system;

a connector which connects the camera and the body; and a focusing mechanism for moving the optical system to a position for macro photography with in-focus state.

12. The portable terminal as claimed in claim 11, wherein said connector rotatably connects the camera and the body.

13. A driving method for moving a plurality of lens units from a first position for a first photography magnification to a second position for a second photography magnification, the driving method comprising:

a setting process for setting the respective moving speeds of lens units in accordance with the moving distance of each lens unit moving from the first position to the second position; and a driving process for driving the lens units independently at the set moving speeds of the respective lens units.

14. A driving method for moving a plurality of lens units from a first position for a first photography magnification to a second position for a second photography magnification, and moving the lens units to a third position for a third photography magnification from the second position, the driving method comprising:

a first driving process for driving the lens units from the first position to the second position;

a stopping process for stopping the movement of a lens unit that reaches the second position; and a second driving process for driving the lens units from the second position to the third position after all lens units have arrived at the second position.

\* \* \* \* \*